Figure 1:
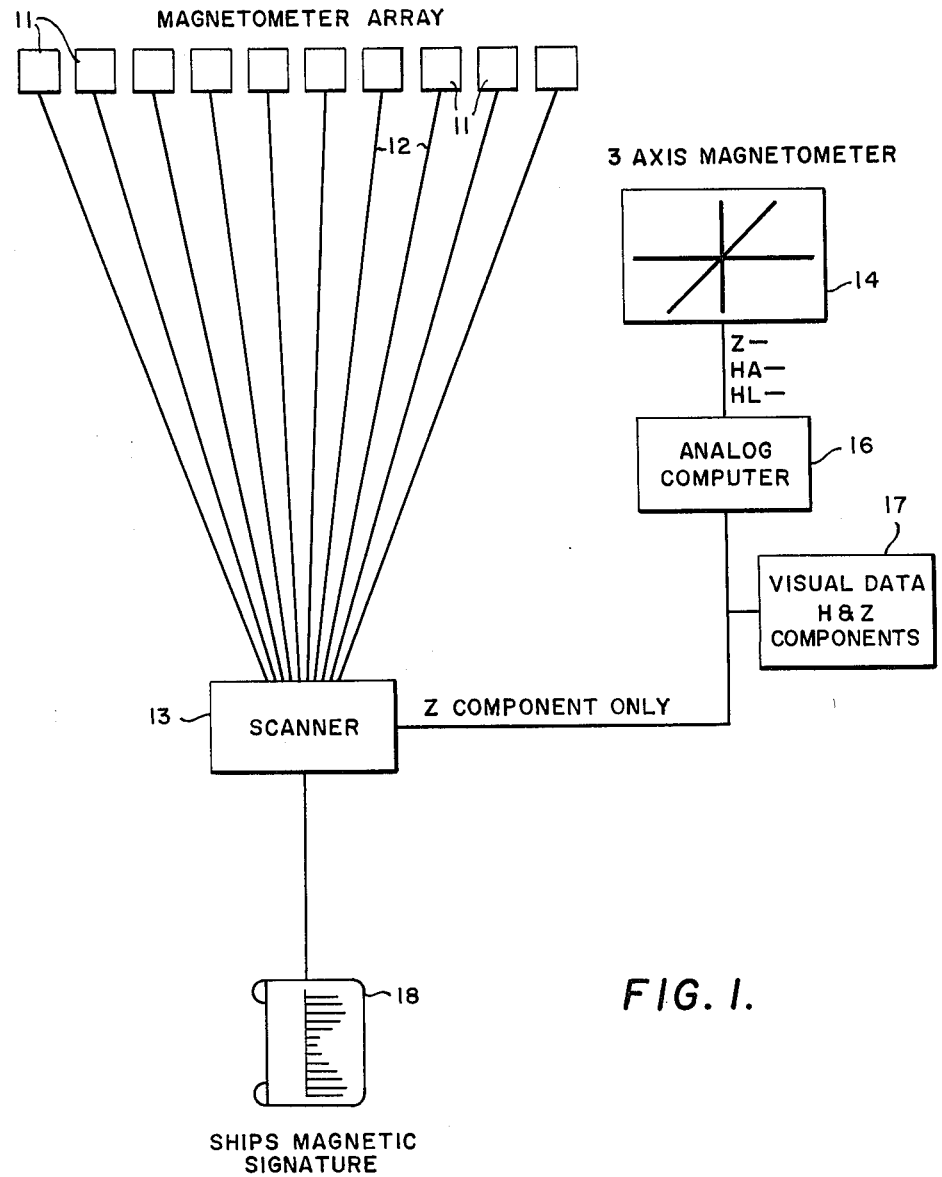

United States Patent Office 3,215,904
Patented Nov. 2, 1965

3,215,904
MINE COUNTER MEASURE SHIPS DEGAUSSING STATUS INDICATOR
Wayne E. Burt, Alexandria, Va., assignor to the United States of America as represented by the Secretary of the Navy
Filed Dec. 22, 1961, Ser. No. 161,748
8 Claims. (Cl. 317—157.5)
(Granted under Title 35, U.S. Code (1952), sec. 266)

The invention described herein may be manufactured and used by or for the Government of the United States of America for governmental purposes without the payment of any royalties thereon or therefor.

The present invention relates to the control of and measurement of magnetic fields and more particularly to a shipboard system for monitoring the magnetic signature of a ship and automatically controlling the degaussed condition thereof.

Degaussing systems have for some time been considered to be valuable countermeasures against magnetically operated weapons such as mines and torpedoes, and magnetic detection devices. These weapons and devices operate on the principle that a body, such as a ship, containing iron distorts the magnetic lines of force of the earth's magnetic field and this localized distortion may be utilized to trigger the mines or torpedoes thereby destroying the ship. Such distortion results from the fact that the iron in the ship causes the ship to have a magnetic reluctance which is considerably lower than that of air and/or water. Therefore, greater number of flux lines tend to crowd through the low reluctance path resulting in a substantial change in flux density at the location of the vessel and thereabout over the previously existing field pattern. Then too, the vessel may have a magnetic field of its own and this field is superimposed on the earth's field. This additionally distorts the earth's field by either adding to or subtracting from the local field pattern of the earth depending upon the orientation of the ship's field with respect to the ship and the orientation of the ship with respect to the earth.

Coils of conductors distributed about the vessel comprise the major essential elements of a degaussing system. Ideally these degaussing coils overcome the effects of the vessel's presence by completely restoring the pre-existing field pattern of the earth.

In minesweeping operations, the ship's deguassing becomes of utmost importance since the minesweeping vessel must, to accomplish its mission, operate in close proximity to mines, some of which may be magnetically operated. To the magnetic signature of the minesweeper this becomes of such a critical nature that freqent deguassing check rangings are required to assure that the ship's deguassed condition is acceptable for minesweeping operations. However, minesweeper degaussing ranges are not alway located near the areas of operation of the minesweeping vessels and therefore minesweepers having a doubtful degaussed condition are forced to return to a degaussing range for checking. In so doing, valuable time is, of course, lost and the minesweeping operations are delayed.

Although optimum degaussed conditions can be obtained at degaussing ranges and shipboard degaussing systems, responsive to the ship's attitude while under way and automatically controlled thereby, are in use, various disadvantages are still inherent in existing systems. For example, existing systems fail to take into account changes in degaussed conditions due to a variety of factors aboard the vessel. Such factors as magnetic material adrift, improper degaussing settings, unauthorized magnetic material, and defective degaussing equipment can cause sufficient variation in the ship's magnetic properties to bring disastrous results.

It is therefore an object of the present invention to provide shipboard installed equipment for monitoring magnetic field conditions and particularly the degaussed status of the ship.

Another object is to provide a degaussed conditions monitored automatic degaussing control system for shipboard installation.

Briefly the above objects are accomplished, in accordance with the present invention, by the provision of an array of magnetic field sensing devices located at various monitoring points, an optimum standard for comparison purposes, and means for comparing actual values with the standard. From this equipment the degaussed condition of the ship may be monitored continuously. If desired, there may also be provided means, responsive to the comparing means, for providing sufficient degaussing current to restore the optimum value magnetic field.

Figure 2:
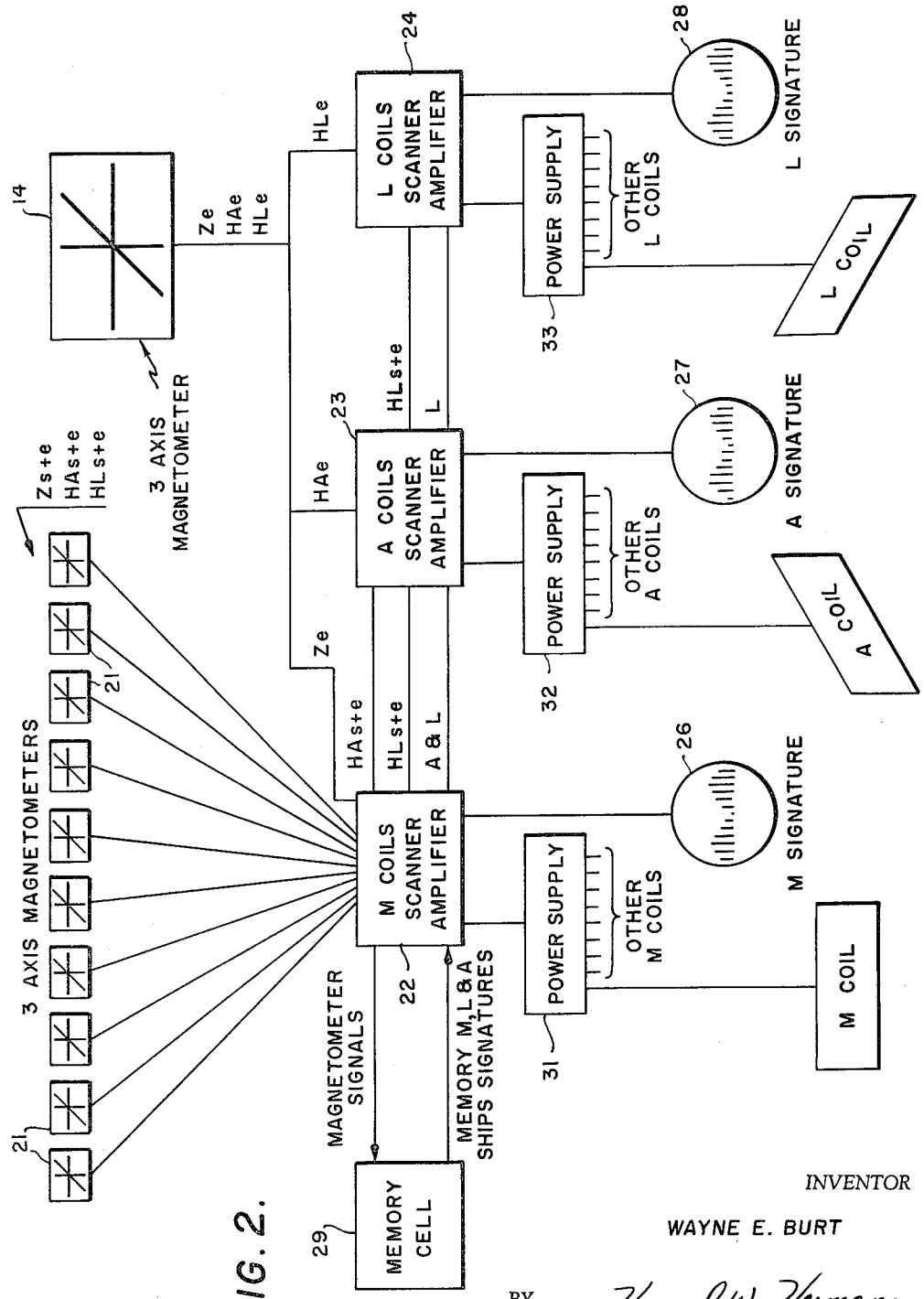

Other objects and many of the attendant advantages of this invention will be readily appreciated as the same becomes better understood by reference to the following detailed description when considered in connection with the accompanying drawings in which like reference numerals designate like or corresponding parts throughout the figures thereof and wherein:

FIG. 1 is a block diagram of a degaussing status monitoring system made in accordance with the present invention; and FIG. 2 is a block diagram of a degaussed condition monitored automatic degaussing control system made in accordance with the present invention.

Referring now to the drawings, wherein like reference characters designate like or corresponding parts throughout the several views, there is shown in FIG. 1 an array of magnetic field measuring devices (illustrated by magnetometers) 11 for detecting magnetic fields in the vicinity of the ship. It will be realized that although magnetometers are shown, other sensing devices are within the scope of the present invention. Ideally, the field measuring devices are mounted below the ship since any magnetic mine dangers would be below the ship. Therefore, the maintaining of the ship's degaussed condition from under the ship is a positive control and shows the ship's degaussed condition as it would be detected by sensitive objects below the ship. The devices 11 may therefore be mounted on telescoping rods projecting from the ship's bottom at a series of points. Such telescoping rods may, for example, be extended and retracted hydraulically from within the ship in order to prevent unnecessary drag or breakage while the ship is under way between degaussing status checks.

It has been found, however, that the magnetic field above an object bears a relationship to the magnetic field below the object. On this premise, the measuring devices 11 may alternatively be located in an array above the ship. The devices are then located on fixed or retractable rods or tubes mounted on the ship's decks, sides, and/or bulkheads.

Whether the magnetic field measuring devices are located above the ship or below the ship the operation of the system described herein is identical, although it will be realized by those skilled in the art that the advantages of one placement over another may dictate one type of installation as necessary for a particular application to any given vessel. The devices 11 of the array must be located in a sufficient number of locations to give a true indication of the degaussing status of the vessel as a whole. For this reason the number of devices will also vary with the particular installation.

Referring again to FIG. 1 each of the magnetometers 11 is electrically connected by means of a line 12 to an electronic scanner 13 which receives electrical signals corresponding to the magnetic fields sensed by the magnetometers 11.

In addition to the magnetometer array, a three-axis earth's magnetic field measuring device (shown in the drawing as a magnetometer 14) is provided for sensing the earth's magnetic field. This device is preferably mounted high on the ship's mast so that it will not be affected by the ship's magnetic influence. The three axes of the device 14 measure the earth's magnetic field in three components; i.e. athwartships (H$a$), longitudinal (H$l$), and vertical (Z). These three signals are fed from the device 14 to analog computer 16 where the two H vectors (H$l$ and H$a$) are combined to give a resultant total earth's field H component. Mathematically, this accomplished simply by use of the Pythagorean theorem; i.e. $H=\sqrt{Hl^2+Ha^2}$. The H and Z data means 17 is for monitoring purposes. This means may, for example, comprise a recording voltmeter calibrated in milligausses to thereby provide a permanent record.

The Z component of the earth's field is in turn fed also to the scanner 13 where it is substracted from the vertical magnetic field sensed by each of the sensing devices 11 as their outputs are scanned. The resultant signal is fed from the scanner to a visual indicating instrument 18 which may for example be a recorder if a permanent record is desired, or alternatively may be a cathode ray indicator. The signal consists of a vertical line, or pip, for each magnetometer of the array. A line connecting the ends of the vertical lines or pips which represent the entire array will then be the ship's magnetic signature. If desired, a template representing the ship's magnetic signature at the time of its degaussing ranging may be provided for comparison with the readings acquired at each monitoring measurement. Any discrepancies between the standard magnetic signature and the magnetic signature as monitored will then be noted by the ship's crew and if outside acceptable limits, will point to possible danger areas. The crew can then check the ship for the difficulty and correct it before it can be harmful.

FIG. 2 illustrates an automatically controlled degaussingsystem similar in basic concepts to the monitoring system of FIG. 1. As shown in FIG. 2, an array of 3-axis magnetometers 21, or other magnetic field measuring devices, spread about the ship, are connected to a scanning system which is divided into 3 components, one for each set of degaussing coils aboard the ship. These coils are generally designated as the M coils which correct the vertical or Z component of the ship's magnetic field, the A coils which neutralize the athwartship or HA component, and the L coils which neutralize the longitudinal or HL components of the ship's magnetic field.

The 3-axis measuring devices each derive 3 signals, one for each of the Z, HA and HL axes, and, of course, each signal represents the sum of the ship's magnetic field and the earth's magnetic field ($s+e$) in that particular direction. Therefore, a 3-axis earth's magnetic field measuring device (shown as a magnetometer 14) again is provided for sensing the earth's magnetic field along the three axes. The signals from the devices: $Z_{s+e}$, $HA_{s+e}$ and $HL_{s+e}$ and the signals from the earth's magnetic field measuring device: $Z_e$, $HA_e$, and $HL_e$ are both fed into the M coil scanner 22, the A coil scanner 23 and the L coil scanner 24 respectively, wherein the components of the earth's magnetic field are substracted from the signals derived from the array of devices and the resultant signals are amplified and displayed on suitable visual display devices 26, 27 and 28 each of which may, for example, be a cathode ray tube or a recording instrument.

In order to render a basis for comparison a ship magnetic signal mememory 29 is provided. At the time of the ship's degaussing ranging, the outputs of the array of magnetic measuring devices are impressed in the memory cell 29 which may, for example, consist of a tape recording instrument and associated circuitry. Thereafter, this memory cell is read out each time a scan of the array is made and the M, L, and A ship's signatures of the memory are compared with the M, L, and A signatures as respectively derived by the scanners. Signal comparator means in each of the scanners 22, 23 and 24 in turn produce a signal which is used to regulate power supplies 31, 32, and 33 respectively for varying the demagnetization current in the M, A, and L coils as necessary to keep the magnetic signature of the ship within the desired limits. At the same time visual monitors, i.e. display devices 26, 27, and 28, are available so that circuit failures may be detected by the person monitoring the operation of the system.

The system, as described herein, therefore provides a dependable degaussed condition monitor for shipboard installation as well as a degaussed condition monitored automatic degaussing control system for use aboard ship. The system is self compensating for changes in the ship's magnetic fields due to changes in heading, attitude or location of the ship.

Obviously, many modifications and variations of the present invention are possible in the light of the above teachings. It is, therefore, to be understood that within the scope of the appended claims the invention may be practiced otherwise than as specifically described.

I claim:

1. A ship magnetic field monitoring system comprising:
    a plurality of magnetic field sensing devices capable of repeatedly providing electrical signals corresponding to the sensed magnetic field;
    scanning means for scanning said electrical signals;
    indicating means responsive to said scanning means for providing a visual indication of said scanned signals;
    said indicating means including a cathode ray tube upon which said scanned signals are displayed;
    means for sensing the earth's magnetic field in the vicinity of said ship and deriving an electrical signal therefrom; and
    means for subtracting the signal corresponding to the earth's magnetic field from the signals transmitted to said scanner from said sensing device to provide an output signal for controlling degaussing equipment.

2. An automatically controlled ship degaussing system comprising:
    a plurality of magnetic field sensing devices capable of providing an electrical signal corresponding to the sensed magnetic field of the ship;
    scanning means for scanning the electrical signals provided by said sensing devices;
    signal comparison means for comparing said electrical signals with a standard, and producing an output signal indicative of said comparison;
    a plurality of degaussing coils capable of excitation by an electrical current to produce a magnetic field; and
    power supply means regulated by the output of said signal comparison means for supplying electrical current to said degaussing coils.

3. An automatically controlled ship degaussing system as defined in claim 2 but further including:
    means for sensing the earth's magnetic field in the vicinity of said ship and deriving an electrical signal corresponding thereto; and
    means for subtracting the signal corresponding to the earth's magnetic field from the signals transmitted to said scanning means from said sensing devices;
    whereby the signal comparison means receive a signal corresponding to the ship's field alone.

4. An automatically controlled ship degaussing system as defined in claim 3 wherein:
said magnetic field sensing devices include 3-axis magnetic field measuring devices arranged to sense vertical, longitudinal, and athwartships components of the sensed magnetic fields;
said power supply means include three separate power supply units; and
said degaussing coils are arranged in three different planes, each of said power supply units being connected to the degaussing coils of a single plane.

5. An automatically controlled ship degaussing system as defined in claim 4 wherein:
said means for sensing the earth's magnetic field is a 3-axis measuring device;
said subtracting means includes 3 subtracting units; and
signals from each of said axes are fed into a respective earth's magnetic field measuring device subtracting unit for subtraction from the magnetometer signal representing the signal sensed along the same axis.

6. An automatically controlled ship degaussing system as defined in claim 5 wherein:
said signal comparison means includes a memory device having impressed therein a standard corresponding to the ship's optimum magnetic signature.

7. An automatically controlled ship degaussing system as defined in claim 2 wherein:
said magnetic field sensing devices include 3-axis magnetic field measuring devices arranged to sense vertical, longitudinal and athwartships components of the sensed magnetic fields;
said power supply means include three separate power supply units; and
said degaussing coils are arranged parallel to three different axes, each of said power supply units being connected only to degaussing coils arranged parallel to one of said axes.

8. An automatically controlled ship degaussing system as defined in claim 7 but further including:
signal comparison means for comparing the signal sensed by said measuring devices with a standard and deriving an output therefrom to control the outputs of said power supply units.

References Cited by the Examiner
UNITED STATES PATENTS

| | | | |
|---|---|---|---|
| 2,626,308 | 1/53 | Schmidtt | 324—43 |
| 2,832,041 | 4/58 | Trachtenberg | 317—157.5 |
| 2,834,939 | 5/58 | Tolles | 317—157.5 |
| 2,856,579 | 11/58 | Packard | 324—43 XR |
| 2,891,502 | 6/59 | Cochran et al. | 317—157.5 XR |
| 3,061,239 | 10/62 | Rusk | 324—43 |

SAMUEL BERNSTEIN, *Primary Examiner.*